United States Patent [19]

Stroh

[11] Patent Number: 5,280,814
[45] Date of Patent: Jan. 25, 1994

[54] DEVICE FOR RECOVERING HYDROCARBON VAPORS IN FUEL DISPENSING SYSTEMS

[75] Inventor: Wilfried Stroh, Egelsbach, Fed. Rep. of Germany

[73] Assignee: Ross Europa GmbH, Fed. Rep. of Germany

[21] Appl. No.: 951,561

[22] Filed: Sep. 25, 1992

[30] Foreign Application Priority Data

Sep. 25, 1991 [DE] Fed. Rep. of Germany ....... 4131976

[51] Int. Cl.⁵ ............................................... B65B 3/18
[52] U.S. Cl. ........................................ 141/83; 141/44; 141/46; 141/59; 141/302
[58] Field of Search ............................. 141/59, 44-46, 141/83, 302, 198

[56] References Cited

U.S. PATENT DOCUMENTS

| | | |
|---|---|---|
| 2,802,492 | 8/1957 | Gosselin . |
| 3,863,687 | 2/1975 | Alquist ................................... 141/45 |
| 3,952,781 | 4/1976 | Hiller et al. ............................ 141/46 |
| 4,057,085 | 11/1977 | Shihabi . |
| 4,197,883 | 4/1980 | Mayer ................................... 141/59 |
| 4,256,151 | 3/1981 | Gunn ..................................... 141/59 |
| 4,260,000 | 4/1981 | McGahey et al. ..................... 141/59 |
| 5,038,838 | 8/1991 | Bergamini ............................. 141/59 |
| 5,040,577 | 8/1991 | Pope . |
| 5,156,199 | 10/1992 | Hartsell, Jr. .......................... 141/83 |
| 5,195,564 | 3/1993 | Spalding ............................... 141/1 |

FOREIGN PATENT DOCUMENTS

| | | |
|---|---|---|
| 3723943 | 2/1988 | Fed. Rep. of Germany . |
| 8717378 | 10/1988 | Fed. Rep. of Germany . |
| 4000165 | 7/1990 | Fed. Rep. of Germany . |
| 3903603 | 8/1990 | Fed. Rep. of Germany . |

*Primary Examiner*—Ernest G. Cusick
*Attorney, Agent, or Firm*—Harness, Dickey & Pierce

[57] ABSTRACT

The invention relates to a device for recovering hydrocarbon vapors in fuel delivery systems comprising a proportional throttle valve which is mounted in a vapor recovery line to a tank, with the valve being controlled by an error signal which is a function of the fuel volume flow and the vapor volume flow. Accordingly the vapor volume flow returned by a vacuum pump to the container is controlled. The invention further relates to the structure of the proportional throttle valve, including a tandem piston arrangement.

22 Claims, 3 Drawing Sheets a = Input Current
b = Valve Stroke

DEVICE FOR RECOVERING HYDROCARBON VAPORS IN FUEL DISPENSING SYSTEMS

BACKGROUND AND SUMMARY OF THE INVENTION

The present invention relates to a device for recovering hydrocarbon vapors in fuel dispensing systems.

In fuel delivery systems, in particular when refueling the tank of an automotive vehicle through a filling nozzle, a portion of the fuel entering the tank evaporates due to the lower vapor pressure of the fuel. The vapor escapes through the fuel filling tube into atmosphere. This has to be prevented primarily because of the cancerous properties of the hydrocarbon. For this purpose a gas recovery system is provided to be used at all gas stations for returning the vapors occurring through a conduit to the stationary fuel container from which the fuel is pumped to the filling nozzle. Principally, the liquid volume of fuel delivered to the vehicle tank approximately equals the gas volume to be returned to the stationary tank.

According to a prior art device, a vacuum pump is provided in the vapor recovery line for extracting the vapor and a valve is provided comprising a pair of floaters, wherein the position of a first floater is adjustable in proportion to the fuel volume to be delivered which position is transmitted to the second floater by means of a rod or a permanent magnet which second floater controls the gas volume to be returned in the gas recovery line. In this system the fuel volume represents the controlling parameter and the control of the gas volume is performed mechanically. The mechanical system does not operate precisely enough.

It is an object of the present invention to provide a device of recovering hydrocarbon vapors such that the gas recovery volume is controlled highly accurately and reliably.

According to the invention the object is solved by the features of the claims. The subclaims refer to features of preferred embodiments of the invention.

According to the invention the return flow of the vapors is controlled by a proportional throttle valve which is arranged between the vapor line and the vacuum pump. The volume flow of the fuel delivered is measured, preferably by the electronic fuel meter of the fuel pump. The signal is used as a desired value. In addition, the gas volume flow returning to the stationary container is measured to provide a signal for the actual value. From a comparison of both the desired and the actual value, an error signal is generated which is used to control the solenoid of the proportional valve.

Still further, the atmospheric air pressure may be measured to correct the control signal for the solenoid in response to the atmospheric pressure. This increases the accuracy of the gas volume control as the volume of gas recovered is a function of the pressure difference between the atmospheric pressure and the vacuum pressure.

As mentioned before, in many cases the volume flow of the vapor returned equals the fuel volume delivered. This ratio can be varied when the signal of the electronic meter of the fuel pump is varied correspondingly so that the gas volume to be controlled may be adjusted to be higher or lower. Moreover the proportional throttle valve may be adjusted in response to the air temperature measured. Accordingly the gas volume flow may be decreased when less fuel evaporates when the air temperature is less.

The arrangement according to the invention still provides for the advantage that vacuum fluctuations in the system as well as atmospheric air pressure fluctuations are sensed and the control of the valve solenoid is accordingly corrected. A further advantage is provided by eliminating mechanical connections between the fuel line and the gas recovery line which could give reason that, for example, liquid fuel may enter the gas recovery line.

The structure of the proportional throttle valve according to the invention results in a high control accuracy. The valve according to the invention can be mounted under severe conditions of environment and operates safely. In particular, the valve has a small hysteresis to precisely control the fuel vapor to be returned and to reduce the bleeding of vapors through the vent pipe of the stationary fuel tank. The valve is explosion-safe which is particularly useful with respect to the highly explosive fuel vapors, and can be mounted underneath the installation subjected to wet conditions.

The tandem piston arrangement of the valve according to the invention results in a very accurate central guiding of the valve member to reduce the eccentric forces acting there-on. More specifically, the valve according to the invention has an extremely small hysteresis. This is even improved by the special sealing means for the piston of the valve housing and by providing antifriction guiding faces on the seal.

The throttle area provided between the passage and the connecting rod of the tandem piston limits the volumetric flow of fluid through the passage even when the valve is fully opened. This reduces the environmental load by less vapor escaping through the stationary tank vent pipe.

The tandem piston is actuated through a force transmitting member such as a plunger which can be actuated by an electromagnetical, mechanical or fluid operated actuator. Preferably, the valve housing and the actuator are separated from each other by an intermediate body serving as a geometrical and thermical isolation.

The dual seal arrangement provided by the tandem piston makes the valve particularly useful to be mounted in fuel vapor recovery systems.

In order that the invention may be fully understood a preferred embodiment of the invention will now be described by way of example, with reference to the accompanying drawings. The drawings show:

DETAILED DESCRIPTION OF THE PREFERRED EMBODIMENTS

Figure 1:
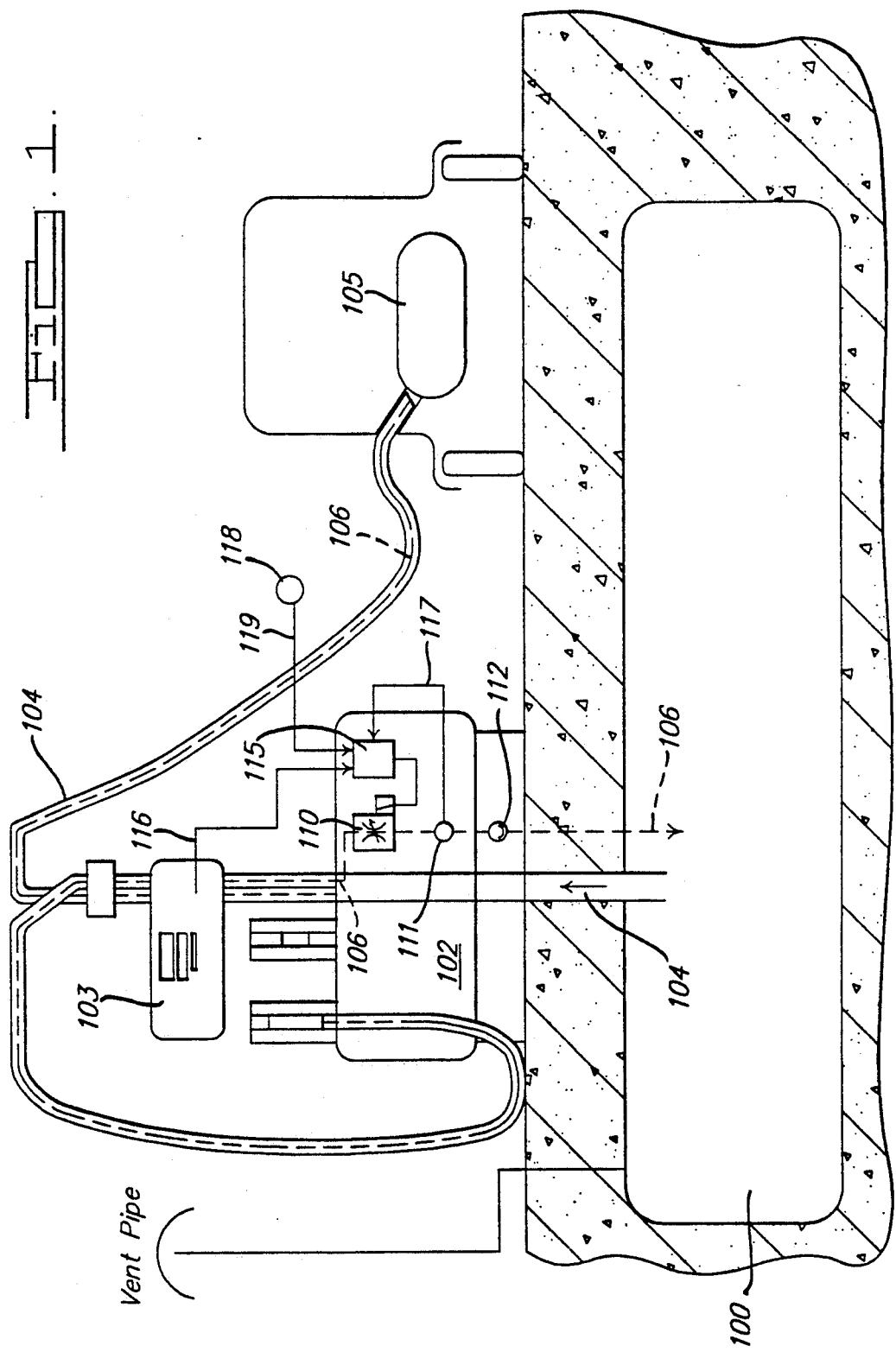
FIG. 1 is a schematical illustration of a fuel recovery system according to the invention.

FIG. 1 shows a buried tank 100 from which fuel is pumped by a fuel pump (not shown) in the pump station 102, through an electronic meter 103 and a fuel hose 104 into the receptacle or tank 105 of an automotive vehicle. The fuel vapors thus occurring in the tank 105, i.e. hydrocarbon gases, are returned through an internal coaxial vapor recovery line 106 to the stationary tank 101. A proportional throttle valve 110, a gas volume flow sensor 111 and a vacuum pump 112 are provided in the line 106.

In refueling systems for vehicles running on leadfree fuels the lines 104 and 106 are usually formed as coaxial hoses opening through the filling nozzle into the filling tube to the gasoline tank 105, wherein the fuel flows through the outer hose and the gases are exhausted through the inner hose 106.

The proportional throttle valve 110 is electrically connected to an amplifier control unit 115 or, respectively, to other electronic controls. The electronic meter 103 delivers electrical pulses, whose frequency is a function of the fuel liquid volume flow. This signal defines a desired value which is delivered through a control line 116 to the amplifier 115. The gas volume flow recovered through the line 106 is measured by a gas volume sensor 111 generating a signal, which defines an actual value representation of the gas flow and which is delivered through the control line 117 to the amplifier 115. The amplifier calculates the difference between the desired gas flow value and the actual gas flow value, which difference is a control signal to be delivered to the solenoid of the proportional throttle valve 110. Accordingly, the gas volume flow returned can be controlled and can be adjusted to a predetermined ratio between the volume liquid flow of the fuel and the volume gas flow of the vapor. This ratio may be 1:1, but may be different when the desired value is varied in the amplifier 115 with a multiplication factor which can be voluntarily selected, as discussed below.

In addition, the valve 110 can be controlled by introducing further parameters regarding disturbances, such as the air pressure which is measured by a pressure sensor 118 delivering a signal, which is applied as a correcting value for the difference control signal (referred to above) through a control line 119 to the amplifier 115. For example, when the air pressure increases, the pressure difference between the air pressure and the vacuum pressure in the hose 106 or, respectively, the container 100 increases alike, and in response thereto the valve 110 is controlled to reduce its cross-sectional area in order to reduce the gas volume flow. Still further, the valve 110 may be controlled in response to the air temperature to throttle the valve when less fuel evaporates, such as at low air temperatures. In addition, pressure in the vacuum system can be sensed and processed in the amplifier control unit 115 to correspondingly vary the signal applied to the solenoid of the valve 110.

The sensor 111 may be replaced by other pressure sensors (not shown), one sensor each provided at the inlet and the outlet of the valve 110. Accordingly, the pressure difference across the valve 110 is measured, and by taking into account the throttle cross-sectional area of the valve 110, the actual value of the gas volume flow may be calculated.

Figure 2:
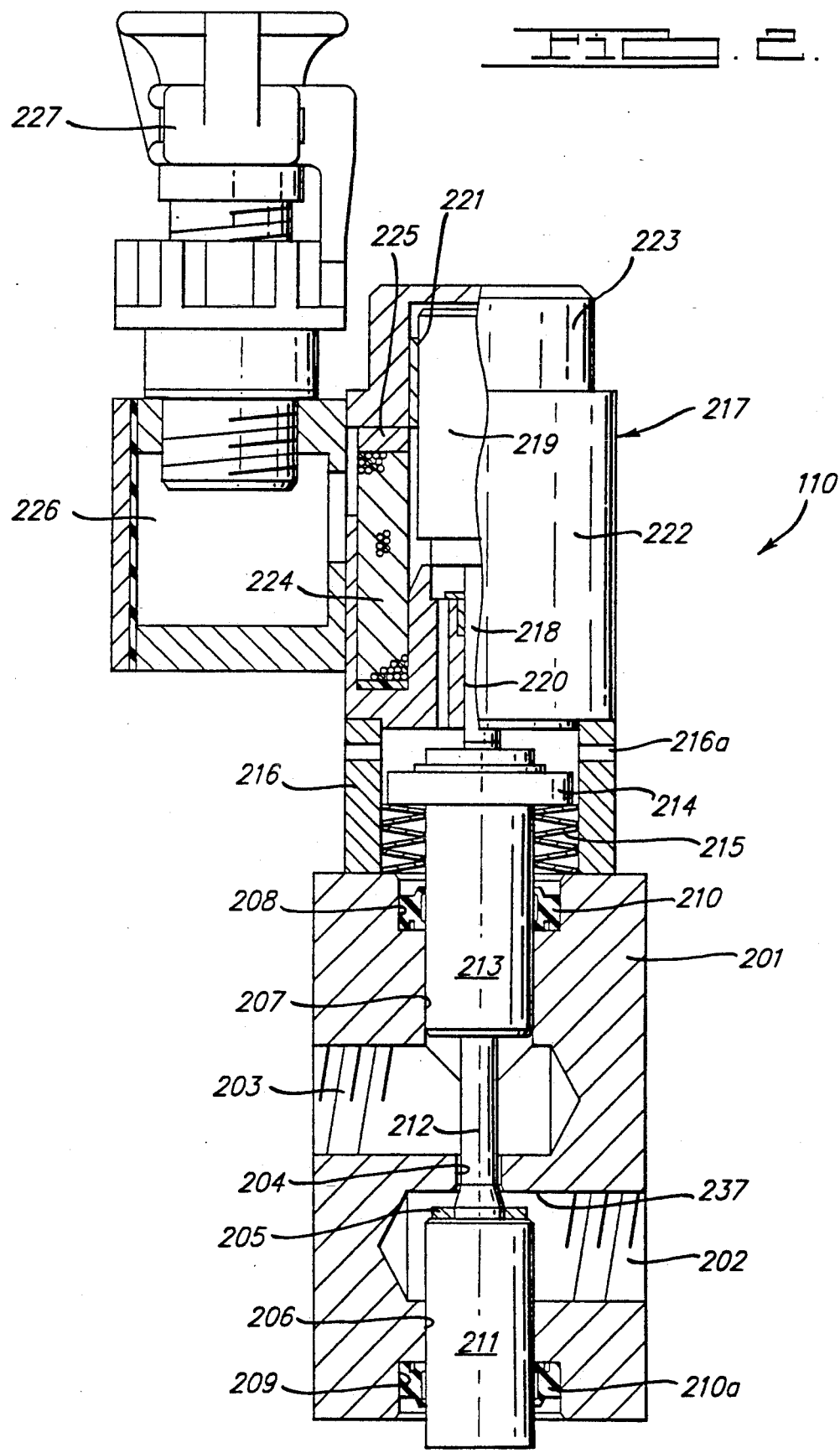
FIG. 2 is a section through a proportional valve incorporating an explosion safe solenoid.
Figure 3:
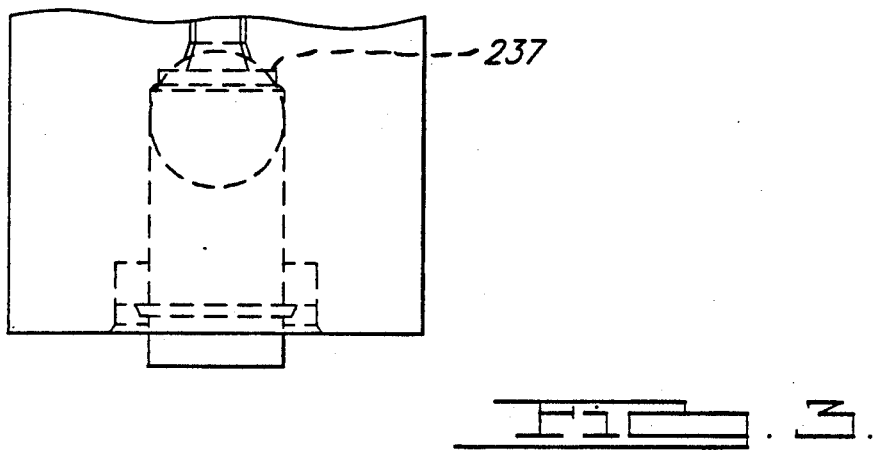
FIG. 3 is a side view of the lower section of the valve housing shown in FIG. 2.

The proportional valve 110 shown in FIGS. 2 and 3 comprises a valve housing 201, having an outlet port 203 and an inlet port 202 defined by axially off-set bores which are connected by a vertical passage or through-opening 204, having a cross-sectional area to be controlled as mentioned above. The inlet and outlet ports 202 and 203 may be connected to fittings (not shown), but may receive a plug-in-couplings, or the like, as well.

The lower side of the passage 204 is flat to provide a valve seat 237. On either side of the passage 204, and concentrically thereto, cylindrical bores 206 and 207 are arranged, each having a common axis which is normal with respect to the axes of the bores defining the inlet and outlet ports 202 and 203. Annular recesses 208 and 209, each having sealing elements 210 and 210a, respectively, are provided in the outer end of each of the bores 206 and 207. Each sealing element 210 and 210a is provided with a pair of sealing edges. The annular wedge-like recess between both the sealing edges is filled with a lubrication substance to reduce friction.

The bores 206 and 207 receive a tandem piston arrangement comprising a lower piston 211 and an upper piston 213, which are connected by a connecting rod 212 which is secured to the pistons by cementing, for example.

Both pistons 211 and 213 are guided and are fluid-tight by the seals 210a and 210 in the bores 206 and 207, respectively. The lower piston 211 extends through the housing 201 so that its lower face (FIG. 2) is subjected to atmosphere.

The opposite head face of the piston 211 is provided with an annular valve seal 205 cooperating with the valve seat 237. The valve seal 205 comprises a resilient plastic sealing ring which is secured to the head face of the piston 211 by means of a metallic disk. The valve housing 201 is made of a harder material than the resilient sealing 205 such that the seal 205 cooperates with the valve seat 237 to close the passage 204.

As shown in FIG. 2, the part of the connecting rod 212 adjacent the piston 211 is provided with a tapered sealing face cooperating with a tapered sealing face in the lower portion of the passage 204. When the tandem piston arrangement 211 and 213 is moved from the open position shown in FIG. 2 upwardly into its closing position, the passage 204 is closed by the sealing 205 contacting the valve seat 237 and in addition thereto by the sealing faces of the connecting rod 212 and the passage contacting each other. The twofold seal provided in series results in a high degree of safety with respect to a tight closing of the valve 110.

Between the connecting rod 212 and the passage 204 there is an annular gap through which the fluid passes from the inlet port 202 into the outlet port 203 when the valve 110 is open. This annular gap is determined such that it defines a throttle in the maximum opening position of the pistons 211 and 213 to very accurately limit the volumetric rate of fluid therethrough. The bores 206 and 207 bear an antifriction surface coating, for example, a chemical nickel coating. This coating can be replaced by a guide sleeve inserted in each of the bores 206 and 207. In addition the cylindrical faces of both of the pistons 211, 213 may be provided with an antifriction coating, such as a nickle-coating, including polytetrafluoroethylene. A lower friction results in a small hysteresis of the proportional valve 110.

The upper piston 213 extends through the housing 201 upwardly through an intermediate body 216 which is attached to the housing. Opening 216a in the intermediate body 216 provides an access to the atmosphere to the upper head face of the piston 213, whereas the lower face of the piston 213 is subjected to the pressure in the outlet port 203. Pistons 211 and 213 have an equal diameter so that the piston faces subjected to fluid pressure have equal areas.

The pistons 211 and 213 are biased towards their closing positions by a resetting element defined by a spring 215. The spring 215 preferably is a Belleville type spring, or it could be a coiled spring, made of stainless steel, which is provided between the upper side of the housing 201 and an annular flange 214 of the piston 213, the body 206 serving to guide and centering the spring 215.

An actuator is removably attached to the upper side of the body 216, comprising a force transmitting member 218 shaped as a plunger to engage the upper side of the piston 213 in a manner to exert minimum eccentrical forces thereto.

The solenoid 217, shown in FIG. 2, comprises an armature 218 and a winding 224 which are accommodated in a housing 222 including a cover 223. A ring 225 holds the winding 224 in the casing. The plunger 218 and the armature 219 are guided in sliding bearings 220 and 221. A common electrical connection, shown at reference numerals 226 and 227 is provided. The operation is as follows: The tandem piston arrangement 211 and 213 is biased by the spring 215 into the closing position in which the passage 204 is closed by the twofold series sealing arrangement indicated above. When a signal is applied to the solenoid 217, the pistons 211 and 213 are moved downwardly towards the open position. The opening stroke of the piston 211, and thus the volumetric rate through the passage 204, is proportional to the current signal applied to the solenoid 217.

Figure 4:
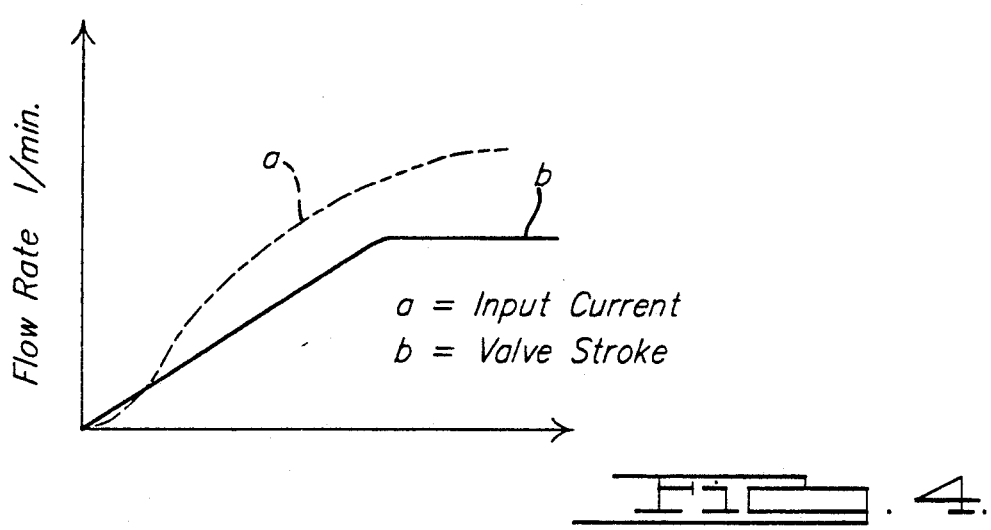
FIG. 4 is a diagram of the volumetric rate in response to the solenoid input signal or, respectively, the valve stroke.

FIG. 4 shows a volumetric rate diagram. Accordingly, curve a illustrates the volume passing through the passage 204 (FIG. 2) in response to the input current, and the curve b shows the volume flow in response to the valve piston stroke. The curves may be adapted to particular requirements by preselecting the passage 204 and/or the shape of the connecting rod 211 (FIG. 2).

Figure 5:
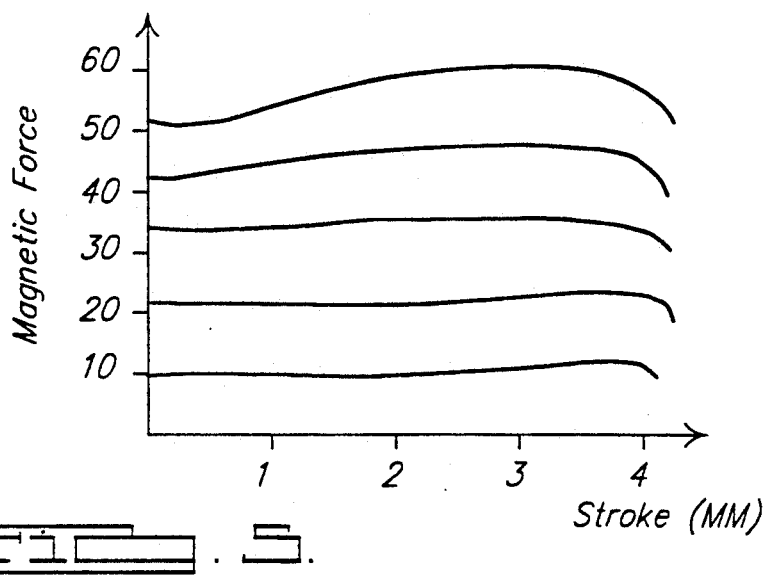
FIG. 5 is a diagram showing the magnetic force in response to the valve stroke.

FIG. 5 shows magnetic force curves of the solenoid in response to the valve stroke and the current when the voltage is maintained constant.

As the annular gap between the bore 204 and the rod 212 functions as a throttle, the flow of fluid passing through the fully opened valve is limited to a predetermined value, for example 40 l/min.

What is claimed is:

1. A system for recovering hydrocarbon vapors in fuel filling system having filling means for delivering fuel from a stationary fuel container to a receptacle, comprising a fuel vapor recovery line in communication with a vacuum pump, said vapor recovering line opening into said stationary fuel container, a valve and a vacuum pump arranged in said vapor recovery line to exhaust vapor originating from the fuel evaporating through the vapor recovery line to said stationary fuel container, wherein the valve controls the flow rate of the vapor, said system being further characterized in that the valve is a proportional throttle valve, said system including control system for sensing a fuel volume flow rate of fuel being delivered to the receptacle and a vapor volume flow rate of fuel vapor flowing through the vapor recovery line and for measuring the difference between the fuel volume flow rate and the vapor volume flow rate in order to produce an error signal, said control system including valve control means for throttling said valve in response to said error signal in order to throttle the vapor volume flow rate.

2. The system of claim 1, wherein the fuel filling system includes an electronic meter, and wherein the fuel volume flow rate is the output signal of said electronic meter of the fuel filling system.

3. The system of claim 1, wherein a vapor volume flow rate sensor is provided in the vapor recovery line downstream of the proportional valve.

4. The system of claim 1, wherein a passage having a vapor volume flow rate sensor therein is provided between the proportional valve and the vacuum pump.

5. The system of claim 1, wherein the control system includes adjustment means to select the ratio between the fuel volume flow rate and the vapor volume flow rate.

6. The system of claim 5, wherein the control system includes an atmospheric pressure sensor and means for throttling the proportional valve in response to atmospheric air pressure.

7. The system of claim 5, wherein the control system includes an atmospheric air temperature sensor and means for throttling the proportional throttle valve in response to atmospheric air temperature.

8. The system of claim 1, wherein a pressure sensor is provided both upstream and downstream of the proportional valve, and wherein the vapor volume flow rate is calculated from the pressure difference of the pair of sensor and the amount of throttling of the proportional valve.

9. The system of claim 1, wherein the proportional valve comprises a valve housing including inlet and an outlet ports, a valve member in a through-opening communicating between the inlet and outlet port, a resetting means for biasing said valve member toward a closed position, a controllable actuating means acting on said valve member against the force of said resetting means to control the opening and closing of said valve member in said through-opening, wherein said valve member includes a pair of pistons slidably guided in bores of the valve housing which are in alignment with respect to each other, and a connecting rod extending through said through-opening and connected to said pair of pistons wherein a fluid path in the area of the through-opening and the connecting rod has an area that defines the maximum flow area through said through-opening and thus the maximum vapor flow rate.

10. The system of claim 9, further including an electromagnetic drive means for moving said pistons and thus throttling said proportional valve.

11. The system of claim 9, wherein the valve housing and the drive means are separated from each other and are interconnected by a force transferring member, said drive means being removably connected to said valve housing.

12. The system of claim 11, wherein said force transferring member is vented to atmosphere.

13. The system of claim 9, wherein the sides of the pistons facing away from each other are subjected to atmosphere and the sides of the pistons facing each other are subjected to the vapor fluid to be controlled.

14. The system of claim 13, wherein both said pistons are cylindrical and have the same diameter such that the areas of the sides facing toward each other are equal.

15. The system of claim 9, wherein each of said pistons is sealed with respect to its associated bore by a resilient, or respectively, lubricated seal.

16. The system of claim 9, wherein said pistons are moved toward closing by the force of the resetting means and toward opening by the drive means, wherein one of the pistons blocks opening and closing movement of the pistons in response to the controllable actuating means forces that are insufficient to overcome the biasing of said valve member by said resetting means.

17. The system of claim 16, wherein the resetting force is produced by a spring which is supported on the valve housing and engages an annular flange of the piston facing said drive means.

18. The system of claim 9, wherein said inlet and outlet port are formed as bores disposed laterally of each other and have axes that are vertical to a longitudinal direction of the axes of the pistons and which ports are connected to each other by the through-opening.

19. The system of claim 9, wherein a seal is provided on the side of one of the pistons facing said through-opening, said seal cooperating with a valve seat encircling said through-opening.

20. The system of claim 19, wherein said connecting rod and the through-opening are provided with sealing faces, each of which sealingly engage each other in the closing position of the pistons to close said through-opening.

21. The system of claim 1, wherein a passage having a vapor volume flow rate sensor therein is provided between the proportional valve and a filling nozzle, which is provided on the filling means.

22. The system of claim 5, wherein the control system includes a vacuum pressure sensor for sensing a vacuum pressure in the recovery line and means for throttling the proportional valve in response to said vacuum pressure.

* * * * *